(No Model.)

W. SCHLOESSER.
OPERATING MECHANISM FOR STATION INDICATORS.

No. 505,609. Patented Sept. 26, 1893.

WITNESSES:
E. B. Bolton
A. M. Linton

INVENTOR
Wilhelm Schloesser
BY
Richards &c.
ATTORNEYS

UNITED STATES PATENT OFFICE.

WILHELM SCHLOESSER, OF WIESBADEN, GERMANY.

OPERATING MECHANISM FOR STATION-INDICATORS.

SPECIFICATION forming part of Letters Patent No. 505,609, dated September 26, 1893.

Application filed April 2, 1891. Serial No. 387,456. (No model.) Patented in England April 16, 1891, No. 6,574.

*To all whom it may concern:*

Be it known that I, WILHELM SCHLOESSER, a subject of the Emperor of Germany, and resident of Wiesbaden, Germany, have invented new and useful Improvements in Pressure-Regulators, of which the following is a specification.

The invention has been patented in England April 16, 1891, No. 6,574.

My invention relates to the operation of the lever of a station indicator, its object being to provide means operated by the pressure from the ordinary brake system which means in turn will successively raise the lever which operates the indicating mechanism, and the invention consists of a piston upon which the lever of the indicator rests, said piston being operated vertically by the pressure from the brake system; and further of a special air chamber with ports, connecting therewith and with the main pressure space whereby a part of the pressure may be stored and less pressure required after the first action.

Figure 1:
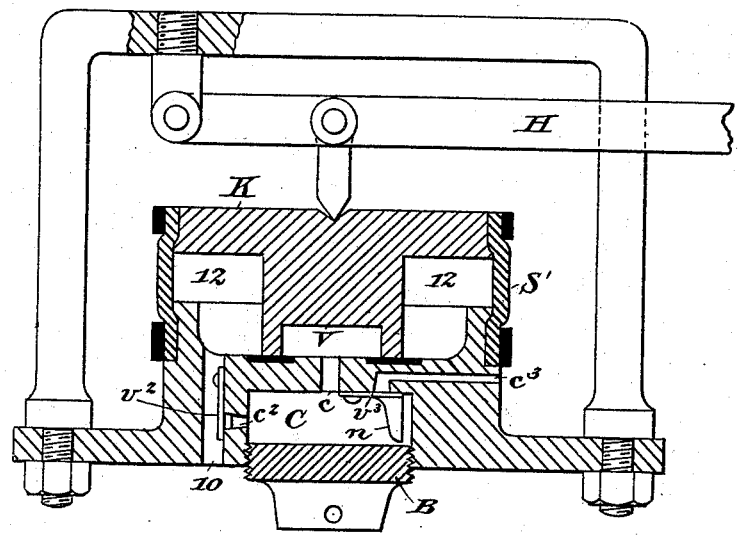
Figure 2:
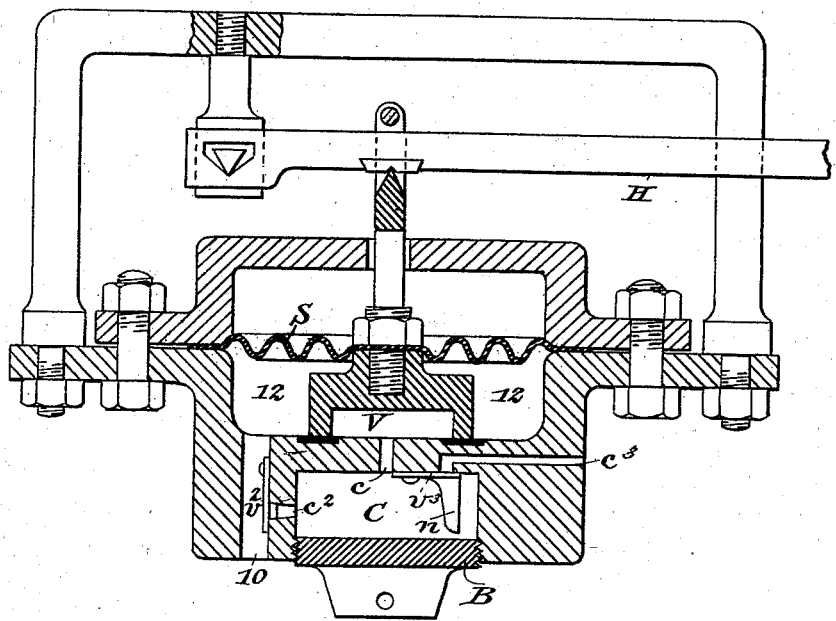

In the drawings, Figure 1— is a sectional view through the operating parts, and Fig. 2— is a like view of a modification.

I have not deemed it necessary to show the indicating mechanism to which the lever to be operated is connected as this may be of ordinary construction.

At a convenient place on the car or other vehicle (not shown) I place a bracket A which supports by a projection $a$ the end of the lever H which extends to the indicating mechanism and operates the same as it (the lever) is successively raised. This lever H is operated vertically by a piston K which is held by a band or ring S' of elastic material secured to its periphery, the other end of the band S' being secured to the periphery of a ring or center $b$ projecting from the base-plate $e$ which is supported from the ends of the bracket A as shown. The piston K thus has limited vertical movement but it is sufficient as the lever H may be long enough to require but a slight raise to operate its opposite end sufficiently to actuate the indicating mechanism.

The piston K is provided with a central base $f$ chambered at $v$ and this recess or chamber is directly over a port $c$ leading to a chamber C. This chamber is in communication with the atmosphere through a port $c^3$ covered by a valve $v^3$ inside the chamber which has a nose $n$ extending downwardly. The weight of this valve keeps it normally open and the amount of its movement may be regulated by adjusting the bottom plug B which bearing against the nose will lift the valve.

A flap valve $v^2$ closes the passage $c^2$ from the outside. The passage 10 is in communication with the pressure cylinders of the ordinary brake system and when the brakes are applied the pressure enters through the passage 10 to the chamber 12. Ordinarily this pressure is not sufficient to raise the piston K and so additional pressure is applied sufficiently to slightly raise the piston which thus allows the pressure to enter the chamber C through the recess $v$ and passage $c$ and as this gives a greater area of surface upon the piston for the action of the pressure the result is the lifting of the piston and the action of the lever H. The pressure as it enters chamber C closes the valve $v^3$. As the pressure is reduced the piston falls and the excess of pressure in C escapes through the passage $c^2$. As a certain pressure remains in the chamber C in the falling of the piston it will be seen that in the next action it will not require such a great pressure to raise the piston as in the first instance.

In Fig. 2—I have shown a diaphragm S substituted for the piston but in other respects the construction is substantially the same.

What I claim is—

1. In combination, with the operating lever of a station indicator, a movable piston or diaphragm, a chamber 12, below the diaphragm, a supplemental pressure chamber C, arranged centrally beneath the piston having an inlet passage from the chamber 12, and a valved outlet passage, substantially as described.

2. In combination, with the operating lever of a station indicator, a movable piston or diaphragm supporting the same, a chamber 12, below the diaphragm, a supplemental pressure chamber C, arranged centrally beneath the piston, a passage $c$, connecting said chamber C, with a recess $v$, in the lower face of the piston, and an outlet $c^2$ from the chamber C, to the passage 10, substantially as described.

3. In combination, with the operating lever H, a piston beneath the same having its lower face recessed, a supplemental chamber C, beneath the piston with a port $c$, leading to the recess in the piston, a valved outlet port $c^2$ from the chamber C, a second valved outlet $c^3$, therefrom, having a valve $v^3$, a nose $n$ on said valve and an adjustable plug B, in the bottom of said chamber C, substantially as described.

In testimony whereof I have signed my name to this specification in the presence of two subscribing witnesses.

WILHELM SCHLOESSER.

Witnesses:
 FRANZ HASSLACHER,
 WILHELM DAMS.